Patented Jan. 21, 1930

1,744,634

UNITED STATES PATENT OFFICE

ALLEETAH H. HILTON, OF VENICE, CALIFORNIA, ASSIGNOR TO EVA ALKIRE, OF LONG BEACH, CALIFORNIA

PROCESS OF TREATING SHELLS FOR MAKING A DECORATIVE MATERIAL

No Drawing.   Application filed February 7, 1928.   Serial No. 252,688.

The present invention relates to the treatment of sea shells, for the production of a material suitable for use in interior decoration. The process is applicable to many different kinds of shells, but is particularly suitable in the case of shells which possess naturally a pearly luster or an iridescent coloring, but in the case of shells which do not show these properties, a dyeing process can be subsequently applied.

I give the following examples, but it will be understood that the invention is not restricted to these particular examples, and the mode of treatment can be substantially varied.

*Example 1.*—Sea shells, in the form of large pieces or whole shells, are soaked for say 48 hours in a solution of citric acid, containing 2 ounces of the citric acid to a gallon of water. The amount of the solution should be sufficient to completely cover the shells. At the end of the period stated, the shells are separated from the remaining liquid, and are put into an oven and baked, for 8 minutes at a temperature of 475° F. The shells are then put into a lye solution consisting of 4 ounces of dry caustic soda to 1 gallon of water. The shells are allowed to soak for twenty-four hours in this solution, and are then removed from the solution and dried, the shells being then crushed and screened down to the desired size of particles. In the screening operation, it is advisable to discard the excessively fine material, whereas the material which is over-sized can be passed back to the crusher and again crushed down to pass through the coarser screen.

*Example 2.*—The sea shells are soaked for 72 hours in a citric acid solution containing 2 ounces of citric acid crystals per gallon of water. The shells are then separated from the remaining liquid, and are soaked for 48 hours in lye solution containing 4 ounces of caustic soda to a gallon of water. The shells are then baked for a period of 13 minutes at 425° F. Crushed and screened as in the previous example.

*Example 3.*—Sea shells are first baked in an oven for a period of two hours at a temperature of 250° F. Then the shells are soaked for 48 hours in a lye solution containing 4 ounces of caustic alkali per 1 gallon of water. The shells are then removed from the liquid, dried and crushed and screened as in the above examples.

*Example 4.*—Sea shells are soaked in citric acid solution containing 4 ounces of citric acid per 1 gallon of water, for a period of 6 days. The shells are then removed from this solution to a lye solution containing 3 ounces of caustic alkali per gallon of water, and are then boiled in this solution for a period of 1 hour. Then dried, crushed and screened as in the above examples.

*Example 5.*—The shells are cooked in a solution made up from 1½ ounces of citric acid or citric acid salts, and 3 ounces of concentrated lye, to 1 gallon of water, for a period of 15 minutes. The shells are then removed from the liquor, and are dried, crushed and screened as in the above example. It is preferable in this case, before crushing, to bake for 30 minutes at 310° F.

I have referred in the above examples to the use of citric acid, but if desired soluble salts of citric acid can be suitably employed as a substitute for the citric acid. Examples of such salts are sodium citrate, potassium citrate, ammonium citrate, magnesium citrate, which may be rendered slightly acid with other acids such as sulphuric or hydrochloric for the production of the best results. In the appended claims, by the expression "reagent containing the citric acid radical" I mean to cover soluble citrates and citric acid.

The concentrations of the solutions as above specified are given by way of example, being the preferred concentrations. However the process can be varied by using weaker or stronger solutions if desired. Generally stated a weaker solution will have to stand for a somewhat longer period, and a stronger solution can be used for a shorter period. In connection with the baking operation, I have referred to certain temperatures but the invention is not restricted to these particular temperatures and times. A higher temperature than that given in the several examples can be employed, and a shorter time of baking will suffice. Likewise a lower temperature for a longer period, can be employed. The relation between time and temperature of the baking operation is that 2 hours at 250° F, will correspond approximately to 4 minutes at 500° F. With delicate shells however it is advisable not to employ a temperature as high as the upper limit here stated, which may injure the shells to some extent.

When the shell is to be used plain (that is to say without a coloring operation) it should be boiled 10 minutes in a solution or mixture of 1 ounce of turpentine to 1 quart of water. This has the effect of improving the result of the treatment.

When the shells as referred to above do not have an attractive color, it is frequently advisable to resort to dyeing for which purpose I preferably employ vegetable dyes, the dyeing being conducted after the crushing and screening operations. An ounce of any vegetable dye, with two quarts of water, can be mixed with say two pounds of the crushed shell, the boiling be continued for say 20 minutes. Then 1 ounce of turpentine is added to the mixture and subjected to a further boiling for 10 minutes. The shells can then be taken out of the dye and washed in cold water until the surplus dye is washed off.

In the above examples where no reference is made to heating the liquor, during a soaking operation, it will be understood that the operation is conducted at ordinary room temperature.

I claim:—

1. A process of treating shells which comprises treating the shells with a solution of a reagent containing the citric acid radical, and thereafter crushing to the desired fineness.

2. In the process as covered in claim 1, the addition of the subsequent step of boiling the crushed product in a bath containing a vegetable dyestuff.

3. In the treatment of shells, the herein described steps of treating the shells with an acid reagent containing the citric acid radical and separately therefrom treating the shells with an alkaline solution.

4. In the treatment of shells, first soaking the shells in citric acid solution, then baking, then soaking in caustic alkali solution, then drying and crushing.

In testimony whereof I affix my signature.

ALLEETAH H. HILTON.